US009152376B2

(12) United States Patent
Johnston et al.

(10) Patent No.: US 9,152,376 B2
(45) Date of Patent: Oct. 6, 2015

(54) SYSTEM AND METHOD FOR CONTINUOUS MULTIMODAL SPEECH AND GESTURE INTERACTION

(75) Inventors: Michael Johnston, New York, NY (US); Derya Ozkan, Playa Vista, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 196 days.

(21) Appl. No.: 13/308,846

(22) Filed: Dec. 1, 2011

(65) Prior Publication Data

US 2013/0144629 A1    Jun. 6, 2013

(51) Int. Cl.
*G10L 21/00* (2013.01)
*G06F 3/16* (2006.01)
*G06F 3/01* (2006.01)

(52) U.S. Cl.
CPC ............. *G06F 3/167* (2013.01); *G06F 3/017* (2013.01); *G06F 2203/0381* (2013.01)

(58) Field of Classification Search
CPC ................. G06F 2203/0381; G06F 3/04883
USPC ............................ 704/231, 251, 270, 275
See application file for complete search history.

(56) References Cited

U.S. PATENT DOCUMENTS

| | | | | |
|---|---|---|---|---|
| 5,577,165 A * | 11/1996 | Takebayashi et al. | ........ | 704/275 |
| 5,600,765 A * | 2/1997 | Ando et al. | ........ | 345/668 |
| 6,868,383 B1 * | 3/2005 | Bangalore et al. | ........ | 704/254 |
| 7,823,089 B2 | 10/2010 | Wilson | | |
| 7,848,917 B2 * | 12/2010 | Soong et al. | ........ | 704/9 |
| 7,881,936 B2 * | 2/2011 | Longe et al. | ........ | 704/257 |
| 8,103,502 B1 * | 1/2012 | Bangalore et al. | ........ | 704/249 |
| 8,132,126 B2 * | 3/2012 | Wilson | ........ | 715/863 |
| 8,140,339 B2 * | 3/2012 | Hernandez-Rebollar | ..... | 704/271 |
| 8,457,959 B2 * | 6/2013 | Kaiser | ........ | 704/231 |
| 2003/0046087 A1 * | 3/2003 | Johnston et al. | ........ | 704/275 |
| 2003/0120494 A1 * | 6/2003 | Jost et al. | ........ | 704/275 |
| 2004/0093215 A1 * | 5/2004 | Gupta et al. | ........ | 704/270 |
| 2005/0257174 A1 * | 11/2005 | Wilson | ........ | 715/863 |
| 2005/0288934 A1 * | 12/2005 | Omi | ........ | 704/270 |

(Continued)

FOREIGN PATENT DOCUMENTS

EP    0594129    4/1994

OTHER PUBLICATIONS

Bernardin, K., Ekenel, H.K., and Stiefelhagen, R. Multimodal identity tracking in a smart room. *Personal Ubiquitous Computing 13* (Jan. 2009), 25-31.

(Continued)

*Primary Examiner* — Douglas Godbold (57) ABSTRACT

Disclosed herein are systems, methods, and non-transitory computer-readable storage media for processing multimodal input. A system configured to practice the method continuously monitors an audio stream associated with a gesture input stream, and detects a speech event in the audio stream. Then the system identifies a temporal window associated with a time of the speech event, and analyzes data from the gesture input stream within the temporal window to identify a gesture event. The system processes the speech event and the gesture event to produce a multimodal command. The gesture in the gesture input stream can be directed to a display, but is remote from the display. The system can analyze the data from the gesture input stream by calculating an average of gesture coordinates within the temporal window.

20 Claims, 9 Drawing Sheets

(56) References Cited

U.S. PATENT DOCUMENTS

| | | | |
|---|---|---|---|
| 2006/0143576 A1* | 6/2006 | Gupta et al. | 715/809 |
| 2008/0228496 A1* | 9/2008 | Yu et al. | 704/275 |
| 2009/0198354 A1 | 8/2009 | Wilson | |
| 2009/0254236 A1 | 10/2009 | Peters, II | |
| 2010/0281435 A1* | 11/2010 | Bangalore et al. | 715/863 |
| 2010/0313133 A1* | 12/2010 | Green et al. | 715/728 |

OTHER PUBLICATIONS

Cohen, P.R., Johnston, M., McGee, D., Oviatt, S.L., Clow, J., and Smith, I. The efficiency of multimodal interaction: a case study. In *Proceedings of International Conference on Spoken Language Processing* (Sydney, Australia, 1998), 249-252.

Ehlen, P., and Johnston, M. Speak4lt and the Multimodal Semantic interpretation System. In *Proceedings of Interspeech* (Florence, Italy, 2011).

Goffin, V., Allauzen, C., Bocchieri, E., Hakkani-Tur, D., Ljolje, A., Parthasarathy, S., Rahim, M., Riccardi, G., and Saraclar, M. The AT&T Watson Speech Recognizer. In *Proceedings of ICASSP* (Philadelphia, PA, 2005).

Harper, L., Gertner, A.S., Herceg, P.M., Hines, T.T., Kemon, E.H., Mireles, D.E., Shadid, M.E., and Guilder, J.A.V., Pervasive and ubiquitous computing in a corporate conference room, Tech. rep., MITRE Corporation, 2004.

Johnston, M., Bangalore, S., Vasireddy, G., Stent, A., Ehlen, P., Walker, M., Whittaker, S., and Maloor, P. MATCH: An architecture for multimodal dialog systems. In *Proceedings of Association of Computational Linguistics* (Philadelphia, PA, USA, 2002), 376-383.

McNeill, D. *Gesture and Thought*. University of Chicago Press, 2005.

Oviatt, S.L. Multimodal interactive maps: Designing for human performance. *Human-Computer Interaction 12*, 1 (1997), 93-129.

Oviatt, S.L. Mutual disambiguation of recognition errors in a multimodal architecture. In *Proceedings of the Conference on Human Factors in Computing Systems*: CHI'99, ACM Press (Pittsburgh, PA, USA, 1999), 576-583.

Reich, D., Putze, F., Heger, D., Ijsselmuiden, J., Stiefelhagen, R., and Schultz, T. A Real-Time Speech Command Detector for a Smart Control Room. In *Proceedings of Interspeech* (Florence, Italy, 2011), 2641-2644.

Rubine, D Specifying gestures by example. *Computer graphics 25*, 4 (1991), 329-337.

Worsley, M., and Johnston, M. Multimodal Interactive Spaces; MagicTV and MagicMAP. In *Proceedings of IEEE Spoken Language Technology Workshop (SLT)* (Berkeley, CA, 2010), 161-162.

Krahnstoever et al. "Multimodal human-computer interaction for crisis management systems," Applications of Computer Vision, 2002 (WACV 2002), Proceedings Sixth IEEE Workshop on Dec. 3-4, 2002, Piscataway, NJ, USA, pp. 203-207, XP10628749, ISBN: 978-0-7695-1858-9.

Kettebekov, et al., "Toward Natural Gesture/Speech Control of a Large Display", Engineering for Human-Computer Interaction (EHCI'01). Lecture Notes in Computer Science, Springer Verlag, 2001.

Krum et al., "Speech and Gesture Multimodal Control of a Whole Earth 3D Visualization Environment", College of Computing, GVU Center, Georgia Institute of Technology, Atlanta, GA 30332-0280 USA, 2002.

\* cited by examiner

SYSTEM AND METHOD FOR CONTINUOUS MULTIMODAL SPEECH AND GESTURE INTERACTION

BACKGROUND

1. Technical Field

The present disclosure relates to human-computer interaction and more specifically to incorporating a continuous speech input stream and a continuous gesture input stream.

2. Introduction

Currently deployed multimodal interfaces, such as systems that support user inputs combining speech and gesture, typically involve direct contact with a screen through touch or pen inputs. For example, the Speak4it application on the iPhone enables users to combine speech inputs with hand-drawn gestures to issue commands. Multimodal interfaces can have applications in other contexts where it is not practical or desirable to touch the screen. These include large screen displays in the living room, displays in medical applications, and smart office environments. In the living room example, users typically interact with content and applications using an overly complicated remote control and complex onscreen menus navigated using arrow keys.

One set of improvements use an infrared camera to track the direction in which an infrared remote control is pointing, enabling users to draw and make gestures on the screen at a distance. Similarly, handheld controllers such as the Wii remote can be used to point at and manipulate what is on the screen. Previous work has also explored adding speech to the remote control for media search and related tasks. In each of these approaches the user has to hold a remote or some other device in order to interact, and often must provide some explicit input, such as a button press, touching a stylus to a display or other pressure-sensitive surface, or uttering a key phrase, to signal to the system to pay attention to and process the input being provided. This approach is cumbersome and requires additional effort (i.e. holding a device and remembering to activate the device at the appropriate time) for handling multimodal inputs.

SUMMARY

Additional features and advantages of the disclosure will be set forth in the description which follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

This disclosure enables multimodal interaction with distant screen displays without requiring the user to carry any hardware or devices for indicating when he or she is going to provide speech or gesture input. This disclosure is directed to an interface and underlying supporting infrastructure and techniques for enabling multimodal interaction with a distant screen display using combinations of natural speech and gesture inputs.

Figure 2:
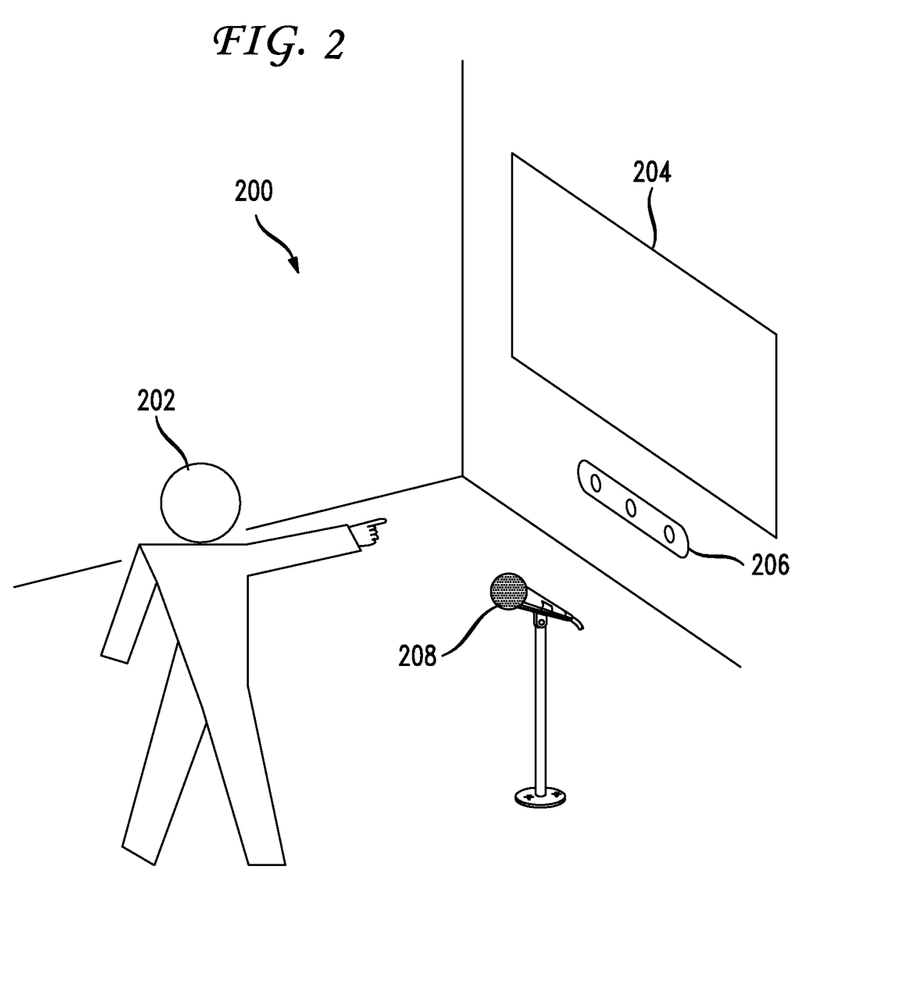
FIG. 2 illustrates an example multimodal interaction arrangement.

FIG. 2 illustrates an example multimodal interaction arrangement scenario 200. A user 202 interacts with a large display 204 on a wall of her living room while sitting on her couch in the middle of the room. From this position, the user 202 is unable to reach the large display 204, but can make natural gestures with her hands, arms, face, and other body parts indicating or selecting on-screen elements in conjunction with natural language commands for interacting with the display. The large display can be a display panel such as one or more LCD or Plasma television, or can be cast on a wall by a projector. The principles disclosed herein can be applied to any display technology.

The system continually recognizes speech either through a wireless microphone, such as a microphone worn as a necklace, lapel pin, headset, earring, and so forth, or through a distant microphone or array of microphones. The system continuously tracks the user's hand gestures through a sensor or group of sensors that track user motions, such as Kinect. This disclosure includes algorithms for multimodal filtering of user speech inputs (multimodal rejection/acceptance of user input) and multimodal semantic integration (fusion of speech and gesture inputs).

Disclosed are systems, methods, and non-transitory computer-readable storage media for processing an audio input stream and a gesture input stream. A system configured to practice the method continuously monitors an audio stream associated with a gesture input stream, and detects a speech event in the audio stream. The audio stream can include input from a microphone or an array of microphones. The gesture can be directed to a display, but is remote from the display, such as a person pointing at a part of a wall-mounted display. The gesture input stream can include input from at least one of a motion detector, a motion capture system, a camera, and an infrared camera.

The system identifies a temporal window associated with a time of the speech event, and analyzes data from the gesture input stream within the temporal window to identify a gesture event. The system can analyze the data from the gesture input stream by calculating an average of gesture coordinates within the temporal window. A gesture filtering module can focus the temporal window based on timing and/or type of specific words in the speech event, or on the type of the speech event. The system detects the speech event in the audio stream without explicit user activation such as a button press or a touch gesture. The system can modify the temporal window based on the gesture event and/or any other data to yield a modified temporal window.

Then the system can process the speech event and the gesture event to produce a multimodal command. For example, the system can identify a speech command from the speech event, identify parameters from the gesture event, and apply the parameters to the speech command. Further, the system can execute or perform an action and/or manipulate on-screen or off-screen elements based on the multimodal command, such as changing a channel, zooming or moving a position of a map, selecting an item, performing a search, deleting an on-screen item, and so forth.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for processing multimodal input. A brief introductory description of a basic general purpose system or computing device in FIG. 1 which can be employed to practice the concepts is disclosed herein. A more detailed description of processing multimodal inputs will then follow, with specific variations being discussed herein involving speech and gesture inputs as the various embodiments are set forth. The disclosure now turns to FIG. 1.

Figure 1:
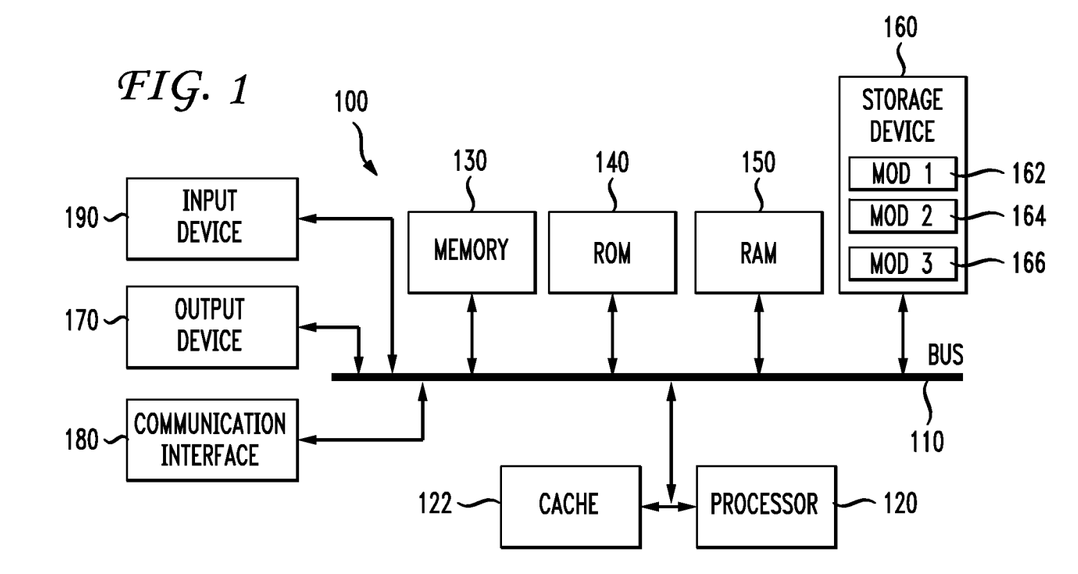
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of integrating continuously recognized speech and continuously recognized gestures. The exemplary system enables true multimodal interaction using direct natural input from the user. The system can continually recognize user speech, such as through a wired or wireless microphone or using a distant array microphone. The system continuously tracks the user's hand and/or other gestures using a sensor or group of sensors that track the user motions. One example of such a sensor is the Kinect which utilizes an infrared projector and camera along with traditional digital cameras to track the position and depth of users in the room.

Other types, quantities, and arrangements of sensors can be used as well. For example, the system can incorporate stereo cameras, time-of-flight sensors, infrared sensors, and/or other sensors. In one example application, the user interacts with a map as part of a travel booking application, and can navigate and ask for information about businesses. In this application, the user issues uni-modal spoken commands, such as "show Seattle Wash." or "Italian restaurant near downtown Chicago", and the screen display will respond accordingly panning the map or showing the requested businesses. Multimodal commands include "zoom in here" where the user "draws" on the screen by pointing their hands or finger at the display without touching the display. Then the sensors detect the gestures in conjunction with the verbal command, calculate the angle and direction of the gestures, and determine at which portion of the display the gesture is aimed. The system can provide visible feedback on the display so the user can see the effect or detected target of the detected gestures, such as a trail of points showing where the user is pointing. The system integrates the zoom command with points from the gesture input stream to build and execute a multimodal command. Similarly restaurant queries can be multimodal, such as speech input "Italian restaurants in this neighborhood" in conjunction with pointing a finger at a particular region of a displayed map.

This solution is significantly more natural and effective because it allows the user to interact directly using their hands and voice rather than using devices that they have to hold. Also the user does not have to explicitly indicate when they are going to provide input using a button or reserved "hot word" to activate the system.

The system can implement specific algorithms for multimodal speech filtering and multimodal semantic integration. These algorithms and their benefits are described below. Multimodal speech filtering determines whether speech inputs captured by the system are in fact directed towards the system or instead result from background noise or cross talk or some other reason.

Given the use of continuous speech recognition without an activation button or remote control, speech filtering can play an important role. The Multimodal speech filtering module uses a combination of features including the acoustic and language model scores from speech recognition and visual features from recent hand gesture activity in order to determine whether the user is addressing the system. In some embodiments, multimodal speech filtering can be achieved with simple sets of rules and thresholds operating over the input features. In other embodiments, decision trees, or other forms of classifiers may be employed to predict the likelihood that speech is addressed to the system. In addition to basic speech features and hand tracking in some embodiments the features may include skeletal position features from tracking the user, face tracking from computer vision, eye gaze from eye tracking, and other features such as the history or the dialog, or recent actions taken by the system.

The system can process inputs from more than one user at the same time. The system can process the inputs as separate speech and gesture streams for each user, or can process the separate speech and gesture streams as part of the same input. For example, two users can conduct completely different conversations with different goals directed to the same screen or to different screens, with the same microphone and gesture input devices capturing their speech and gesture data. Alternately, two users can cooperate in a single task, in which case the system can treat their inputs as part of a same stream, so one user says "find shoe stores", and the other one says "over here" while gesturing to a region on an on-screen map. The system can process the first speech command, and correlate the second speech command with the first speech command and with the gesture.

Further, the system can incorporate natural language understanding to determine whether to ignore, replace, or update specific speech as accidental or mistaken inputs. For example, if a user misspeaks, and then says "no, no, ignore that. I meant . . .", the system can ignore the false start and the corrective language, as well as any gestures that were being processed during that time. Similarly, the system can recognize gestures that indicate a mistake or error, ignore them, and extend the window of time within which gestures are recognized to account for additional gesture input. The system can recognize a gesture of one body part, such as a head shaking side to side, that cancels another gesture of a different body part, such as a finger pointing at a location on a map.

Figure 3:
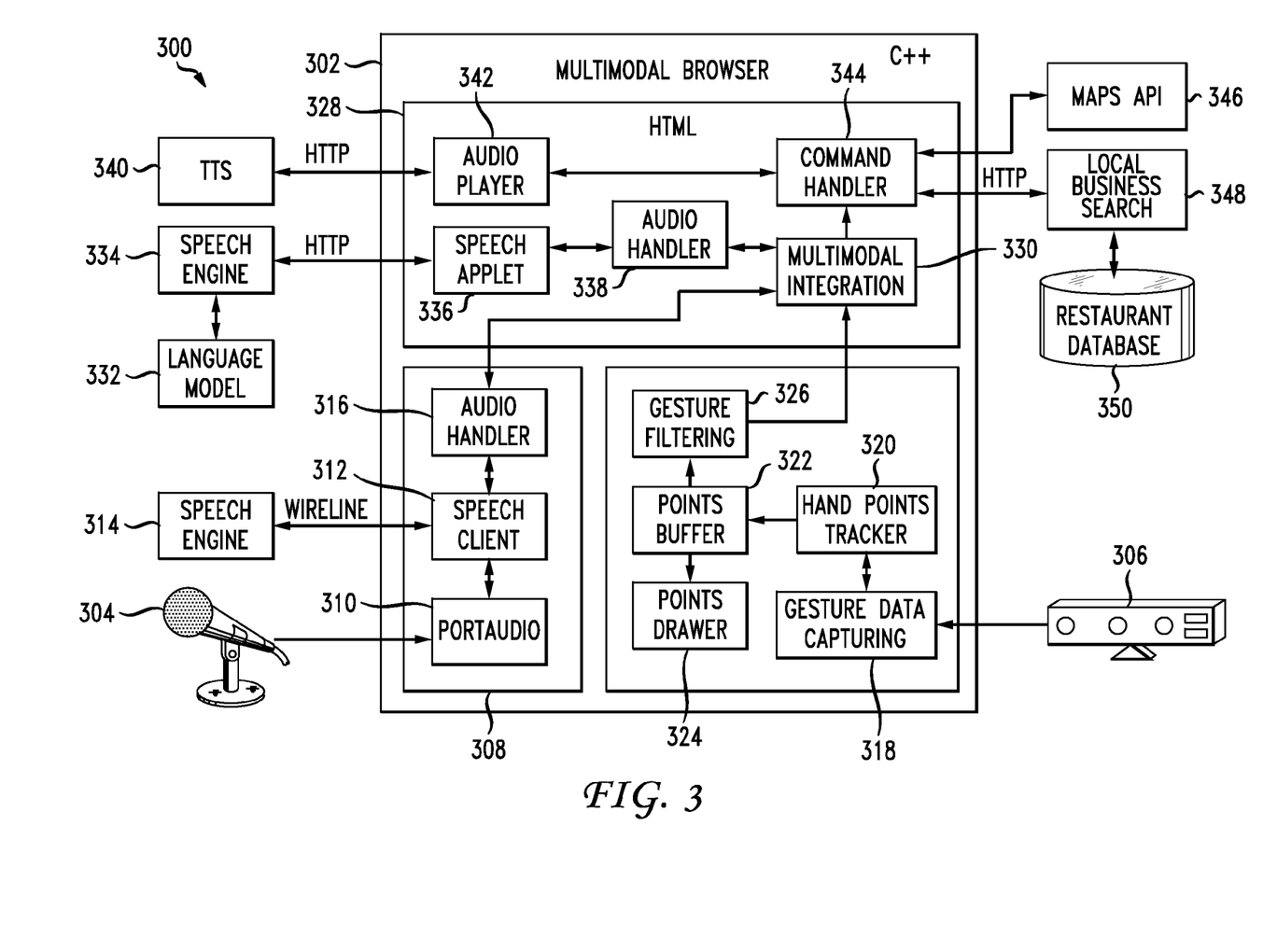
FIG. 3 illustrates an example multimodal processing system.

FIG. 3 illustrates an example multimodal processing system architecture 300, centered around a multimodal browser 302. Once the multimodal browser 302 is launched, the browser 302 loads an HTML page with an embedded map display. The example browser 302 uses a maps API 346, such as the Google Maps API, but can operate using any other source of map or other data. The browser 302 includes a gesture handler 310 that can be implemented in a compiled language, for example. The gesture handler 310 can include various sub-modules, such as a gesture data capturing module 318, a hand points tracker 320, a points buffer 322, a points drawer 324, and a gesture filter 326. The gesture data capturing module 318 can capture data from one or more gesture input devices, or can be a device-specific gesture capturing module, such as a Kinect data capturing module. The audio handler 308 on the other hand, can be implemented as compiled code or as a Java applet on an HTML page, for example. The audio handler 308 can also incorporate various sub-modules, including an audio capture library 310 (such as the PortAudio library), a speech recognition client 312 that connects to a speech recognition engine 314, and an audio handler interface 316.

The audio handler 308 continuously captures audio from one or more microphones 304 using the PortAudio Library 310. The audio handler 308 sends the captured audio, via a client 312, to a speech recognition engine 314 such as AT&T's Watson Engine for speech recognition or other speech recognition engine. The captured audio can be sent via a wired or wireless TCP/IP network or other network. Alternatively, the system can capture audio using a local application, such as via a local audio handler 338 and a local speech applet 336, such as the Watson Java applet, that communicates with the speech recognition engine 334 having its own language model 332 through streaming HTTP requests.

The speech recognizer can runs continuously in both cases. When a result is returned, the Audio Handler interface 316 applies a traditional rejection mechanism based on acoustic and language model scores to accept or reject utterances. A multimodal speech rejection model can incorporate a richer set of features including recent gesture activity and body posture features to detect when a speech command is addressed to the system. Once an utterance is accepted, the Audio Handler interface 316 sends the utterance to a Multimodal Integration Module 330 for fusion of speech input with gesture input.

The gesture handler 310 can use established interfaces, such as the OpenNI and PrimeSense APIs, or custom libraries and interfaces. This exemplary architecture 300 captures depth images by a Kinect sensor 306 and tracks hand point location in this 3D mesh via the hand points tracker 320. The hand points tracker 320 can be initialized by a hand wave or other gesture and the projected location of the hand is displayed as ink on the 2D screen via the points drawer 324. These ink locations are stored in a time indexed points buffer 322 that is accessed by the multimodal integration component 330 in the HTML application 328. The interface can display an ephemeral trace of the recent points that the user has gestured at. This results in a 'snake' or trace of graphically connected or unconnected points which follows the user's hand as the user gestures to draw on the screen, but do not clutter the display with ink that does not correspond to their gesture input.

The system can integrate the speech from the audio handler 308 with the gestures from the gesture handler 310. Multimodal integration can be handled by a JavaScript multimodal integration module 330 in the HTML application 328, for example. This module is triggered by the Audio Handler 316 when there is a speech command. Clocks in the application and the speech recognizer are synchronized at the beginning of each interaction. Depending on the specific speech command recognized, the Gesture Filter 326 provides a proper gesture result. For example, if the user utters "zoom in here", the system examines the word timings to see when the word "here" was uttered. Then, based on that word timing, the system determines the minimal bounding box that contains all of gesture coordinates in a small time interval around the word "here". This bounding box then provides parameters for the zoom command.

The Gesture Filter 326 employs a very simple type of gesture recognition based solely on the area of the bounding box. For example, if the bounding box is very small, the gesture filter 326 can interpret the gesture input as a point, using the average of the coordinates in the time interval. The gesture filter 326 passes that information to the multimodal integration module 330 and consequently to the command handler 344, which instructs the maps API 346 to zoom centered on that point rather than zooming all the way in to the bounding box. If the bounding box is above a certain size threshold, the gesture filter 326 can interpret the gesture input as an area and the map zooms so it contains only the bounding box. Similarly for restaurant search, such as a yellow pages search 348 of a restaurant database 350, the extent, speed, type, and/or other attributes of the gesture can be used to determine whether to show restaurants near to the average point or to show businesses within a delimited area. This simple strategy supports a broad range of multimodal commands, even though it potentially does not involve classification of the gesture based on anything other than size. A more varied set of gestures can support a wider range of gesture classifier 310 inputs. Even more advanced gestures are applied either over a sliding time window of gesture points or to an interval around the corresponding speech command.

Once a user command is interpreted in light of the gesture input and the speech input, the Command Handler 344 invokes the corresponding JavaScript or other functions in the map API 346. In addition, if the command is a 'restaurant query' or 'restaurant information' command, the Command Handler 344 sends an HTTP request to a local business search engine 348, such as an index 350 of Yellow Pages local business data and the business locations or information are displayed on the map. In the case of 'restaurant information' commands the Audio Player 342 is also triggered and accesses a text-to-speech module 340, such as the AT&T Natural Voices text-to-speech synthesizer, to dynamically generate a prompt synthesizing speech describing the restaurant details.

Figure 4:
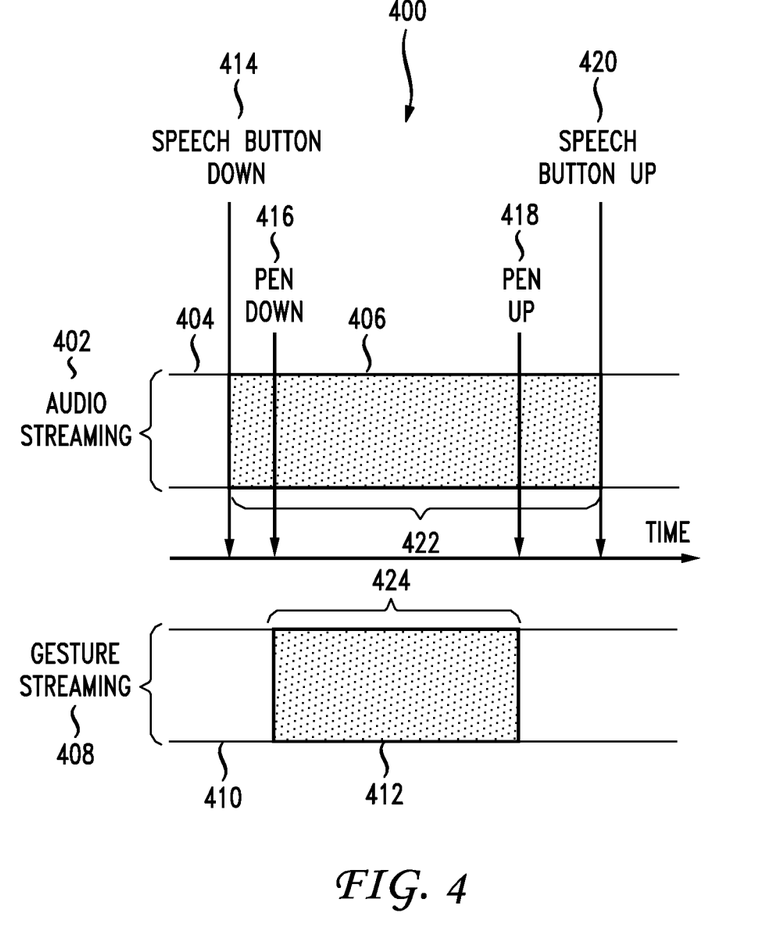
FIG. 4 illustrates a prior art approach to modeling audio and gestures based on explicit input.

FIG. 4 illustrates a prior art approach 400 to modeling an audio stream 402 and a gesture stream 408 based on explicit input. In mobile multimodal interaction, both in research prototypes and in deployed systems, both speech and gesture inputs are generally discrete and clearly delimited by user actions, such as pressing a speech button 414 or touching a pen to a touch-sensitive surface 416 or providing other touch input. In the case of speech, given battery constraints and limitations imposed by noisy environments and privacy concerns, systems typically ignore speech in their default state 404 (denoted in white), and capture speech upon explicit activation 406 (denoted in gray), such as touching a 'click-to-speak' button, either physical on the device or a soft button on a touchscreen, or by uttering a trigger phrase such as "COMPUTER". In this example, the speech button down event 414 triggers speech recognition until the speech button up event 420 occurs, and the pen down event 416 triggers gesture recognition until the pen up event 418 occurs. Thus, speech is recognized only within the gray area 422 of the audio stream 402, and gestures are recognized only within the gray area 424 of the gesture stream 408. Thus, prior art approaches rely on a determined action on the part of the user, such as pressing and releasing a button, or making and ending contact with a touch screen.

Figure 5:
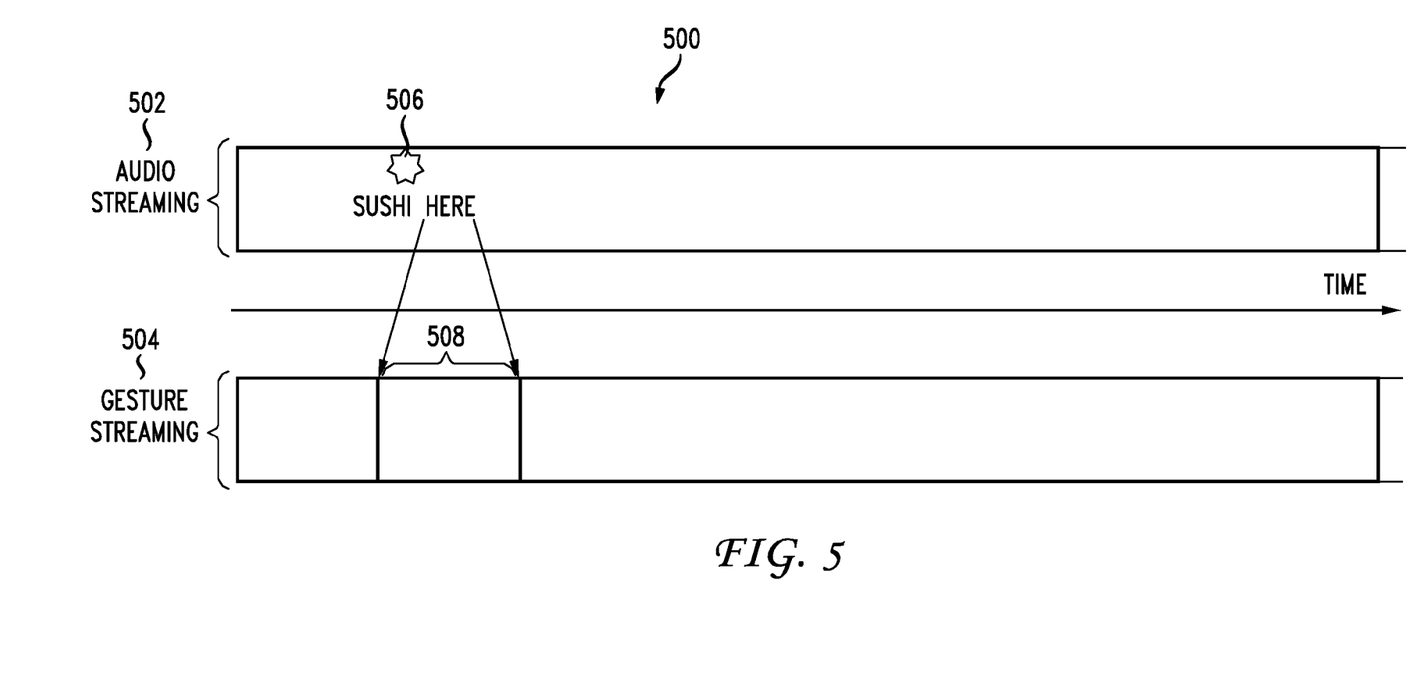
FIG. 5 illustrates an example of modeling audio and gestures using semantic integration.

In contrast to the prior art of FIG. 4, the interface ergonomics are radically different in multimodal interaction systems involving distant displays and sensors such as array microphones and motion detectors and cameras. FIG. 5 illustrates an example of both speech input 502 and gesture input 504, which are continuous and always present. The system continuously captures speech and the system needs to be able to determine which spoken commands are addressed to it and which spoken commands are not addressed to it, as well as differentiate speech from background and environmental noise. The system also continuously captures gestures from the user. In the case of hand tracking the system can maintain an [x,y,z] coordinate for each time point that the system is active rather than only when the user actively chooses to touch a screen. Thus, when the system determines that the user is addressing the system with speech that says "sushi here" 506, the system can recognize the speech and time correlate the word "here" to a specific time range or bounding box. The bounding box can extend forward and/or backward in time from the word "here". The direction, size, and other characteristics of the bounding box can be based on the type, content, and/or other characteristics of the speech, as well as a user profile, preferences, or speech and gesture habits of the user. In this example, the system identifies a region 508 of the gesture stream to process in connection with the speech "sushi here". The gesture stream can include a gesture pointing at a particular region of an on-screen map.

Multimodal semantic integration is more complex in this type of interaction than other multimodal systems because the gesture is not clearly demarked by e.g. touch down, touch up, pen down, pen up events. Rather we have a continuous stream of gesture information coming in from tracking every movement of the users' hand(s). Multimodal semantic integration combines content from speech and gesture in order to determine what the user is trying to convey.

Figure 6:
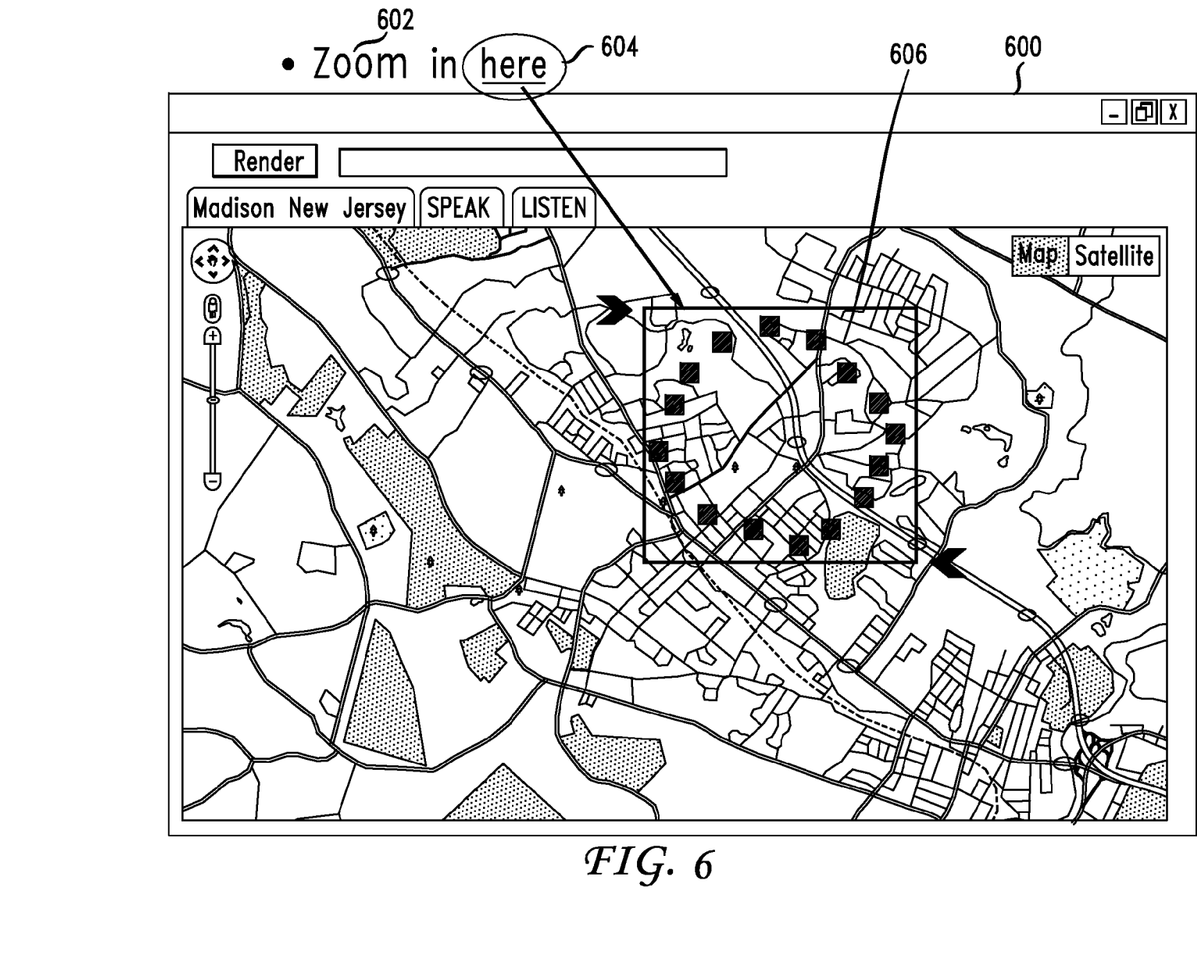
FIG. 6 illustrates a first example recognition of gesture input in coordination with speech.

FIG. 6 illustrates a first example of recognizing gesture input in coordination with speech. In this example 600, the user says "zoom in here" 602 and around the same time that the user says "here" 604, the user points or circles, via a gesture such as pointing with a finger in the air at the display, a particular location 606 on the map. The system processes the two inputs together and understands that the gesture indicates the location at which to zoom in. The system can process the two inputs by accessing a gesture buffer which contains hand track positions indexed by time. When the user's speech is received the time at which a particular word was uttered, e.g. "here" is used to extract points from the gesture buffer. Given that the user's hands may be continuing to move it is not sufficient to, for example, just take the point tracked at the beginning of the word "here". Instead, a variety of sampling and filtering techniques are employed on the gesture buffer. In some embodiments, the system determines the minimum and maximum coordinates on both axes that the user gestured towards within a time window surrounding the gesture phrase in speech. Alternatively, the system can take the average of all the points within a time window surrounding the gesture phrase. The relative area of the bounding box can be defined by the minimum and maximum to determine whether the gesture should be treated as a reference to a point (small) or a region (larger). In other embodiments a neural network, Hidden Markov Model, conditional random field, or other learner can be applied to the gesture and/or speech stream in order to segment and classify portions of the gesture buffer as for example, point gesture, vs. line gestures vs. region gestures.

Figure 7:
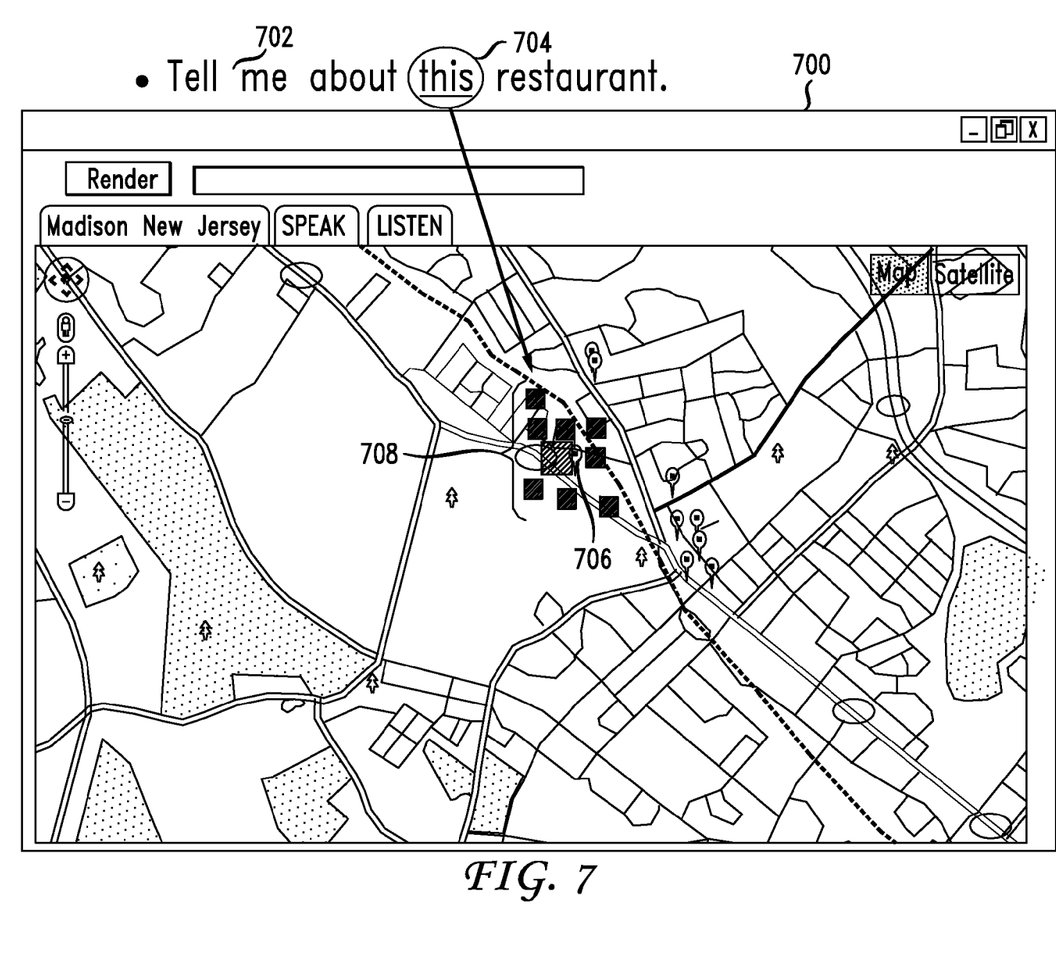
FIG. 7 illustrates a second example recognition of gesture input in coordination with speech.

FIG. 7 illustrates a second example 700 of recognizing gesture input in coordination with speech. In this example, the user says "Tell me about this restaurant" 702, and while saying the word "this" 704, gestures at a restaurant 706 indicated on the map. The gesture tracker detects points 708 to which the user is pointing in the gesture stream. The system can interpret the gesture stream based on the speech. In this case, the user said "Tell me about this restaurant", indicating a single result. Thus, based on this speech, the system identifies a point or an item on the map, and not a broad region. If the system is unclear what the user intended, the system can zoom in to an area of the map indicated by the gestures, and prompt the user to disambiguate the gesture input. Alternatively, the system can verbally prompt the user to confirm one of multiple best-guesses based on the gesture and speech input.

Figure 8:
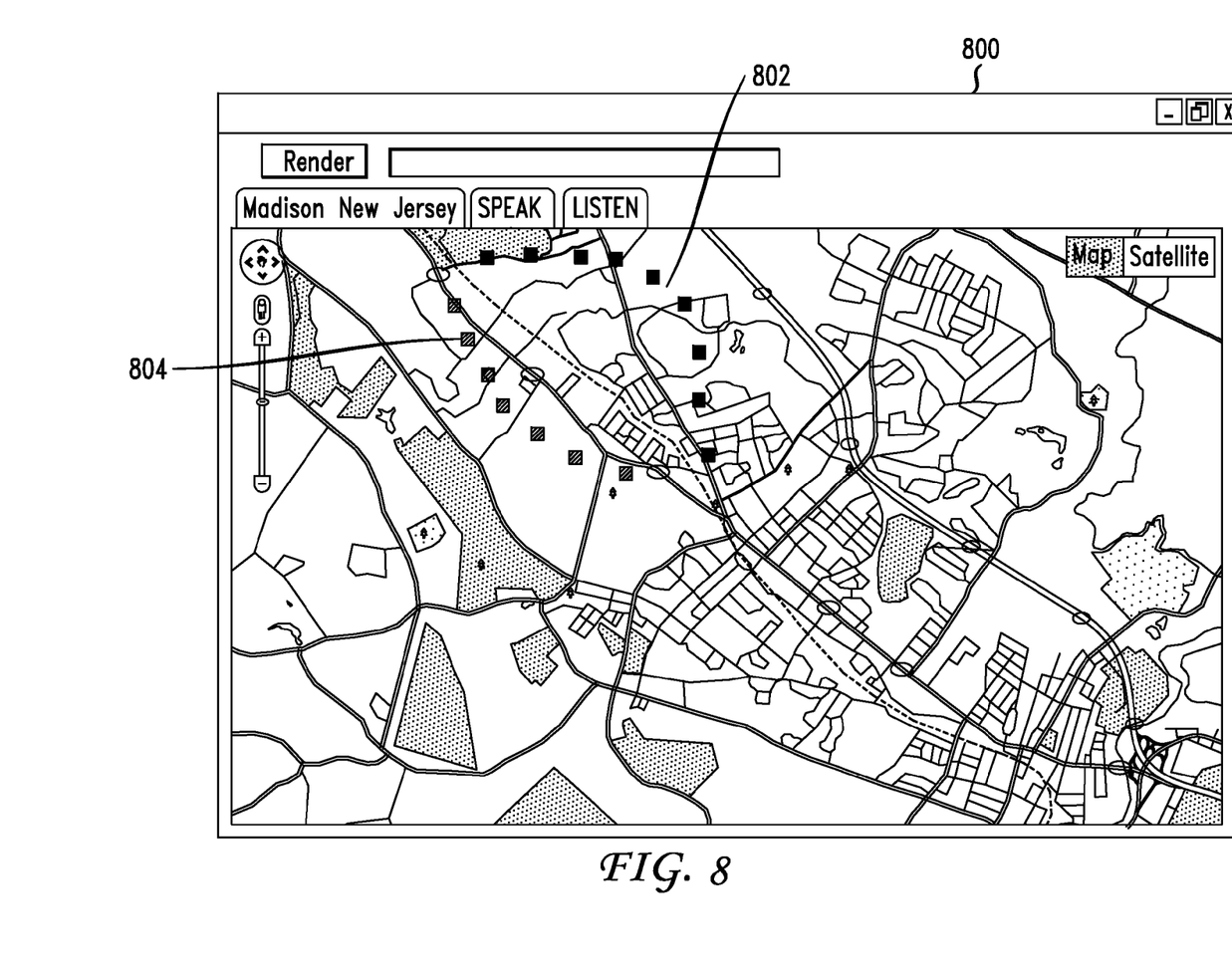
FIG. 8 illustrates an example recognition of gesture inputs drawing at a distance without touching the screen or other input device.

FIG. 8 illustrates an example recognition of gesture inputs drawing at a distance without touching the screen or other input device. In this example, the system displays a map 800, and the user gestures using two hands, making a first gesture stream 802 of points and a second gesture stream 804 of points. The system can process the two gestures to determine that the user wants to zoom in to the region of the map bounded by the first gesture stream 802 and the second gesture stream 804. Thus, the same principles can apply to two or more streams of input of any kind, not necessarily speech and gesture, but also including two gesture streams, or speech plus any other type of continuously monitored input stream.

Continuous gesture input poses further challenges for the rendering of electronic ink on the display. The challenge is to find an effective interface paradigm for supporting 'drawing at a distance'. In mobile applications, the user's gesture on the display can be shown as an electronic ink trace. In the continuous case this is impractical as the display will quickly be covered in ink and obscured. The challenge for multimodal integration of speech commands with continuous gesture input is to determine which portions of the gesture trace over time are relevant for commands. For example, if the user says "zoom in here" and moves their hand around, the system should determine which part of the gesture translates to the location to which the user wants to zoom the map display.

Figure 9:
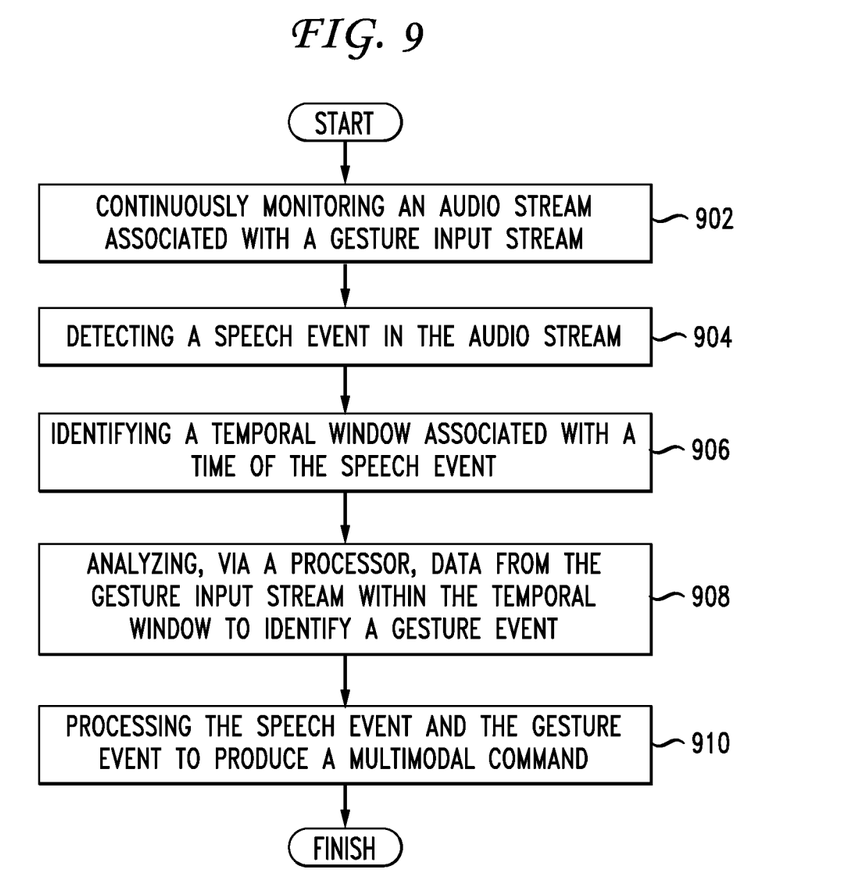
FIG. 9 illustrates an example method embodiment.

Having disclosed some basic system components and concepts, the disclosure now turns to the exemplary method embodiment shown in FIG. 9. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

The system continuously monitors an audio stream associated with a gesture input stream (902), and detects a speech event in the audio stream (904). The audio stream can include input from a microphone or an array of microphones. The gesture can be directed to a display, but is remote from the display, such as a person pointing at a part of a wall-mounted display. The gesture input stream can include input from at least one of a motion detector, a motion capture system, a camera, and an infrared camera.

The system identifies a temporal window associated with the time of the speech event (906), and analyzes data from the gesture input stream within the temporal window to identify a gesture event (908). The system can analyze the data from the gesture input stream by calculating an average of gesture coordinates within the temporal window. A gesture filtering module can focus the temporal window based on timing and/or type of specific words in the speech event, or on a type of the speech event. The system detects the speech event in the audio stream without explicit user activation such as a button press or a touch gesture. The system can identify the temporal window by modifying the temporal window based on the gesture event and/or any other data to yield a modified temporal window.

Then the system can process the speech event and the gesture event to produce a multimodal command (910). For example, the system can identify a speech command from the speech event, identify parameters from the gesture event, and apply the parameters to the speech command. Further, the system can execute or perform an action and/or manipulate on-screen or off-screen elements based on the multimodal command, such as changing a channel, zooming or moving a position of a map, selecting an item, performing a search, deleting an on-screen item, and so forth.

These principles can be incorporated in to a single device, or the various components can be integrated into a room, such as a living room in a smart home. A room-based system can accept commands through interpretation of the multimodal actions of a user. The system allows users to specify their desired tasks both verbally and visually, such as by some specified three dimensional physical gestures.

One specific application is map navigation and local search, but the system can be easily adapted to other application domains. The application allows users to manipulate a map, search for businesses, and get information about them. The system correlates the timing of uttered commands and the gestures made around that time.

The system handles recognition of user gestures in three dimensions by 'projecting' the user's hand gestures to ephemeral ink traces on the display screen, as if the user had a laser pointer in their finger, for example. The system can apply gesture filtering mechanisms to the gesture input. The system allows users to draw at a distance without any touch on the screen, and without touching a gesture input device, such as a joystick, mouse, or stylus.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to set-top boxes provided by a cable television carrier, IPTV provider, or satellite television provider. Further, this approach can be incorporated into game consoles and/or into specific video games. Further, these principles can improve interactive meeting software, military command and control applications, as well as medical informatics applications. Those skilled in the art will readily recognize various modifications and changes that may be made to the principles described herein without following the example embodiments and applications illustrated and described herein, and without departing from the spirit and scope of the disclosure.

We claim:

1. A method comprising:
   continuously monitoring an audio stream associated with a non-tactile gesture input stream;
   identifying a first speech event in the audio stream, the first speech event being from a first user;
   identifying a second speech event in the audio stream, the second speech event being from a second user;
   identifying a temporal window associated with times of the first speech event and the second speech event, wherein the temporal window extends forward and backward from the times of the first speech event and the second speech event;
   analyzing, via a processor, data from the non-tactile gesture input stream within the temporal window to identify a non-tactile gesture event; and
   processing the first speech event, the second speech event, and the non-tactile gesture event to produce a single multimodal command.

2. The method of claim 1, wherein a non-tactile gesture in the non-tactile gesture input stream is directed to a display, but is remote from the display.

3. The method of claim 1, wherein analyzing the data from the non-tactile gesture input stream further comprises calculating an average of non-tactile gesture coordinates within the temporal window.

4. The method of claim 1, wherein processing the first speech event, the second speech event, and the non-tactile gesture event further comprises:
   identifying a speech command from the first user in the audio stream;
   identifying clarifying information about the speech command from the second user in the audio stream;
   identifying parameters from the non-tactile gesture event; and
   applying the parameters and the clarifying information to the speech command.

5. The method of claim 1, wherein a gesture filtering module focuses the temporal window based on timing of specific words in the first speech event and the second speech event.

6. The method of claim 1, further comprising executing the multimodal command.

7. The method of claim 1, wherein one of a length and a position of the temporal window is based on a type of the first speech event and the second speech event.

8. The method of claim 1, wherein the first speech event and the second speech event are detected in the audio stream without an explicit user activation via one of a button press and a touch gesture.

9. The method of claim 1, wherein the non-tactile gesture input stream comprises input one of a motion detector, a motion capture system, a camera, and an infrared camera.

10. The method of claim 1, wherein the audio stream comprises input from one of a microphone and an array of microphones.

11. The method of claim 1, wherein identifying the temporal window comprises modifying the temporal window based on one of the non-tactile gesture event and any other data to yield a modified temporal window.

12. A system comprising:
a processor;
a computer-readable storage medium having instructions stored which, when executed by the processor, cause the processor to perform operations comprising:
continuously monitoring an audio stream associated with a non-tactile gesture input stream;
identifying a first speech event in the audio stream, the first speech event being from a first user;
identifying a second speech event in the audio stream, the second speech event being from a second user;
identifying a temporal window associated with times of the first speech event and the second speech event, wherein the temporal window extends forward and backward from the times of the first speech event and the second speech event;
analyzing, via a processor, data from the non-tactile gesture input stream within the temporal window to identify a non-tactile gesture event; and
processing the first speech event, the second speech event, and the non-tactile gesture event to produce a single multimodal command.

13. The system of claim 12, wherein a gesture in the non-tactile gesture input stream is directed to a display, but is remote from the display.

14. The system of claim 12, wherein analyzing the data from the non-tactile gesture input stream further comprises calculating an average of gesture coordinates within the temporal window.

15. The system of claim 12, wherein processing the first speech event, the second speech event, and the non-tactile gesture event further comprises:

identifying a speech command from the first user in the audio stream;
identifying clarifying information about the speech command from the second user in the audio stream;
identifying parameters from the non-tactile gesture event; and
applying the parameters and the clarifying information to the speech command.

16. The system of claim 1, wherein a gesture filtering module focuses the temporal window based on timing of specific words in the first speech event and the second speech event.

17. A non-transitory computer-readable storage device having instructions stored which, when executed by a computing device, cause the computing device to perform operations comprising:
continuously monitoring an audio stream associated with a non-tactile gesture input stream;
identifying a first speech event in the audio stream, the first speech event being from a first user;
identifying a second speech event in the audio stream, the second speech event being from a second user;
identifying a temporal window associated with times of the first speech event and the second speech event, wherein the temporal window extends forward and backward from the times of the first speech event and the second speech event;
analyzing, via a processor, data from the non-tactile gesture input stream within the temporal window to identify a non-tactile gesture event; and
processing the first speech event, the second speech event, and the non-tactile gesture event to produce a single multimodal command.

18. The non-transitory computer-readable storage device of claim 17, wherein the first speech event and the second speech event are detected in the audio stream without an explicit user activation via one of a button press and a touch gesture.

19. The non-transitory computer-readable storage device of claim 17, wherein the non-tactile gesture input stream comprises input from one of a motion detector, a motion capture system, a camera, and an infrared camera.

20. The non-transitory computer-readable storage device of claim 17, wherein the audio stream comprises input from one of a microphone and an array of microphones.

* * * * *